(12) United States Patent
Su

(10) Patent No.: US 9,705,894 B2
(45) Date of Patent: *Jul. 11, 2017

(54) METHOD AND SYSTEM FOR NETWORK VALIDATION OF INFORMATION

(71) Applicant: Alibaba Group Holding Limited, George Town (KY)

(72) Inventor: Lei Su, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,949

(22) Filed: Mar. 4, 2016

(65) Prior Publication Data

US 2016/0191541 A1    Jun. 30, 2016

Related U.S. Application Data

(63) Continuation of application No. 14/102,077, filed on Dec. 10, 2013, now Pat. No. 9,313,226.

(30) Foreign Application Priority Data

Dec. 21, 2012   (CN) .......................... 2012 1 0562666

(51) Int. Cl.
*H04L 29/06*    (2006.01)
*H04L 29/08*    (2006.01)

(52) U.S. Cl.
CPC .............. *H04L 63/12* (2013.01); *H04L 63/08* (2013.01); *H04L 63/168* (2013.01); *H04L 67/18* (2013.01)

(58) Field of Classification Search
CPC ......... H04L 63/12; H04L 63/08; H04L 63/18; H04L 63/68
See application file for complete search history.

(56) References Cited

U.S. PATENT DOCUMENTS

| | | | |
|---|---|---|---|
| 6,345,278 B1 | 2/2002 | Hitchcock | |
| 6,415,284 B1 | 7/2002 | D'Souza | |
| 8,005,708 B2 | 8/2011 | Cho | |
| 2003/0139948 A1 | 7/2003 | Strech | |
| 2004/0243587 A1 | 12/2004 | Nuyens et al. | |
| 2005/0176500 A1 | 8/2005 | Mathews | |
| 2006/0053083 A1 | 3/2006 | Wiest | |
| 2006/0230315 A1 | 10/2006 | Moyer | |
| 2009/0249186 A1 | 10/2009 | Fetzer | |

*Primary Examiner* — Dao Ho
(74) *Attorney, Agent, or Firm* — Van Pelt, Yi & James LLP

(57) ABSTRACT

Embodiments of the present application relate to a method for network validation of information, a system for network validation of information, and a computer program product for network validation of information. A method for network validation of information is provided. The method includes receiving verification information from a user, the verification information including a plurality of verification fields, determining a verification sequence of the plurality of verification fields based on a verification rule configuration and a verification scoring table, verifying a current verification field according to the verification sequence, verifying a next verification field in the event that the verification of the current verification field succeeds, and terminating verification in the event that the verification of the current verification field fails.

18 Claims, 5 Drawing Sheets

250

400

METHOD AND SYSTEM FOR NETWORK VALIDATION OF INFORMATION

CROSS REFERENCE TO OTHER APPLICATIONS

This application is a continuation of co-pending U.S. patent application Ser. No. 14/102,077, entitled METHOD AND SYSTEM FOR NETWORK VALIDATION OF INFORMATION filed Dec. 10, 2013 which is incorporated herein by reference for all purposes, which is claims priority to People's Republic of China Patent Application No. 201210562666.7 entitled A METHOD AND DEVICE FOR NETWORK VALIDATION OF INFORMATION, filed Dec. 21, 2012 which is incorporated herein by reference for all purposes.

FIELD OF THE INVENTION

The present application relates to a method and system for network validation of information.

BACKGROUND OF THE INVENTION

On the Internet, network validation applications are often encountered in conjunction with membership based websites. For example, a user enters a certain membership-based website and the membership-based website requires the user to enter a username, a password, email address, and other such information. Only after the client and server verify that the membership information is free of error can the user enter the user interface of the members' web site.

Some common methods used in validating the membership information include form verification and access rules verification. Using form verification as an example, after a user submits a form, client verification is performed on the form and then server validation is performed on the form. The client verification includes using technology such as JavaScript JQuery or HTML5 in order to verify form data at the client of the user. For example, the technology determines whether the form-submitted data is empty, lengths are within range, etc. After the form data is verified as correct, the form data is packaged and submitted to the server. The server receives, unpacks, and verifies the form data one piece at a time according to the field display sequence in the form or a configuration sequence.

Conventionally, data verification is accomplished through a script language or other technical means for client verification. Having a fast data verification response speed, results in a better experience for a user undergoing client verification. After issuing a verification demand, the user immediately obtains a verification result. However, the client verification has limited security. Because a script source code of the client is stored in the user browser page, the user is capable of by-passing client verification via a prohibited page script or by using browser tools to simulate action requests.

Therefore, in considering the security of the data, server verification is more secure than client verification. After the user submits the data to the server used in verification, the server will re-verify the data. However, no particular requirements regarding field attributes and field sequences in verification of the data exist. Consequently, some verification data is wasted. The waste of verification data is even more apparent with regard to complex, time-consuming verification steps. Moreover, conventionally, the overall verification process and verification results have insufficient data collection and counting. For example, on a network, a large number of users require verification of three fields (A, B and C) in a form, and the verification time for each field is 1 second. A rule is established that the form is approved when all three fields are approved. If the error rate of A and B is zero, and the error rate of C is very large, 3 seconds of verification time is to be spent for a majority of users to obtain a notice of verification failure.

BRIEF DESCRIPTION OF THE DRAWINGS

Various embodiments of the invention are disclosed in the following detailed description and the accompanying drawings.

The drawings described here are intended to further the understanding of the present application, and form a part of this application. The exemplary embodiments of the present application and the descriptions thereof are intended to explain this application, and do not constitute inappropriate limitation of the present application. Among the drawings.

DETAILED DESCRIPTION

Figure 1:
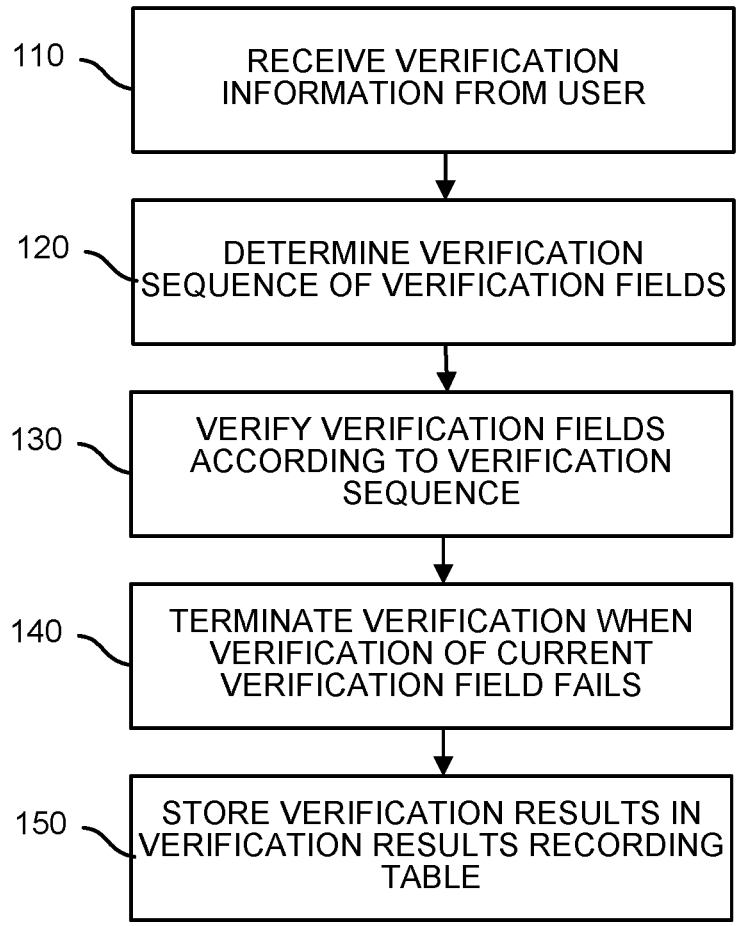
FIG. 1 is a flowchart of an embodiment of a method for network validation of information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The method and system includes the following: receiving verification information from a user, the verification information including a plurality of verification fields, determining a verification sequence of the plurality of verification fields based on a verification rule configuration and a verification scoring table, verifying the plurality of verification fields based on the verification sequence, and storing verification results into a verification results recording table and updating the verification scoring table based on the verification results recording table.

The data verification includes multi-field verification rules, single-field verification rules, and verification dependency relationship configurations. In some embodiments, a plurality of fields constitute a form.

For example, a form includes three verification fields: A, B and C. In the event that all three fields are verified, this means that the form is verified. Therefore, in some embodiments, the logical relationships of the three verification fields are expressed as A&&B&&C. A&&B&&C signifies that A, B and C have parallel relationships. In the situation where A is verified, and only one of B and C is to be verified in order for the form to be verified, the logical relationship of the three verification fields is expressed as A&&(B||C). A&&(B||C) represents that A and B||C are in a parallel relationship, the logical relationship being expressed by B||C is (B or C) and the logical relationships between the various fields being referred to as a multi-field verification rule.

In some embodiments, when verification is performed on a single field, verification conditions include assessing whether the field is empty, whether the field satisfies a regular expression, whether the field exists within a database, etc. The verification conditions used to verify single fields are referred to as single-field verification rules.

In some embodiments, verification processes have one verification condition dependent on the result of another verification condition. For example, two verification fields, A and B, are to be verified. However, the verification condition for B requires the verification result of A. In such a situation, the verification sequence is to be specified through a configuration: first verify A and then verify B. A verification dependency relationship configuration is configured in a manner similar to this configuration.

FIG. 1 is a flowchart of an embodiment of a method for network validation of information. In some embodiments, the method 100 is implemented by a server 430 of FIG. 4 and comprises:

In 110, the server receives verification information from a user. The verification information includes a plurality of verification fields.

In a given system, by design, each type of verification information corresponds to one form identifier, and each verification field of the verification information corresponds to one field identifier and the form identifier. The form identifier and field identifiers corresponding to the verification information are unique. The form identifier corresponding to the verification information is unique within the system and the field identifiers corresponding to the verification fields are unique within the scope of the verification information. For example, assuming that verification information A and verification information B exist, the form identifier corresponding to verification information A is 001 and the form identifier corresponding to verification information B is 002. Moreover, verification information A includes verification field C whose corresponding field identifier is 111. Thus, in the system, only verification A corresponds to form identifier 001, only verification information B corresponds to form identifier 002, and in the verification information A, only verification field C corresponds to field identifier 111. As an aspect, a verification field can occur in the verification information B corresponding to field identifier 111. The information verification process proceeds in accordance with the uniqueness of the form identifiers and the field identifiers. The form identifiers and the field identifiers serve as bases used to verifying the verification information and in performing further operations thereon. For example, verification rule configurations are acquired, verification scoring tables are acquired, and verification results recording tables are processed by looking up the verification rule configurations, the verification scoring tables, the verification results recording tables, statistical rules, and weight configurations which have form identifiers and field identifiers that are the same as the form identifiers and the field identifiers.

In 120, the server determines a verification sequence of the plurality of verification fields based on a verification rule configuration and a verification scoring table.

In some embodiments, the verification rule configuration includes form identifiers and field identifiers for the plurality of verification fields and verification logical relationships between the plurality of verification fields. The verification logical relationships include single-field verification rules, multi-field verification rules, verification dependency relationships, or any combination thereof. The verification scoring table provides one or more parameters associated with each verification field. The one or more parameters include a form identifier, a field identifier, a score, version number, mean verification time spent, mean verification time to pass, mean verification time to fail, verification pass rate, weights, or any combination thereof. As an aspect, the verification rule configuration and the verification scoring table include, but are not limited to including, the above data. For example, serial numbers (IDs) of the plurality of verification fields are saved in the verification results recording table. Moreover, an ID is unique whenever each verification field is verified. The ID is used to differentiate verification of each verification field. In another example, recording times of the plurality of the verification fields are saved in the verification results recording table, etc.

For example, a form (for example, Form 1 below) including three verification fields (A, B and C) to be verified. Form 1 also includes 2 different sets of verification information from users A and B. For example, to verify the registration information that the user filled out on a registration page, user A submitted the form once, and user B submitted the form another time. When the verification information is received, an ID is allocated to each verification field of the verification information: field A is 001, field B is 002, and field C is 003. After the verification has been completed, the three IDs are stored in the verification results recording table. The second time that the verification information is verified, an ID is allocated to each verification field of the verification information: field A is 004, field B is 005, and field C is 006. After the verification has been completed, the three IDs are stored in the verification results recording table. As shown in Form 1 below, the ID for each verification field is different in the two verification processes. The form identifier and field identifier of each verification field remains the same. Therefore, the form identifier and the field identifier of each verification field in the verification information are unique, and the ID for each verification field is unique in each verification.

Form 1

| Field Name | First verification of the verification information | | | Second verification of the verification information | | |
|---|---|---|---|---|---|---|
| | ID | Form identifier | Field identifier | ID | Form identifier | Field identifier |
| A | 001 | 000 | 111 | 004 | 000 | 111 |
| B | 002 | 000 | 112 | 005 | 000 | 112 |
| C | 003 | 000 | 113 | 006 | 000 | 113 |

The combination of the form identifier and the field identifier corresponding to each verification field in the verification information is unique. Therefore, acquiring, based on the form identifier and the field identifiers, the verification rule configuration and the verification scoring table having the same the form identifier and the field identifiers is possible. Each form identifier and field identifier have a corresponding verification mechanism and verification scoring table. Once a form identifier and a field identifier are known, a corresponding look up can be performed.

In some embodiments, the verification sequence for the plurality of verification fields is obtained based on the verification logical relationships between the plurality of verification fields included in the verification rule configuration. The verification scoring table includes the score of each verification field. For example, Table 1 includes verification fields A, B, and C with scores 5, 9, and 2, respectively.

TABLE 1

| VERIFICATION FIELD | SCORE |
|---|---|
| A | 5 |
| B | 9 |
| C | 2 |

A further ordering of verification logic sequence for the plurality of fields is carried out in low-to-high order of the scores, resulting in the verification sequence for the plurality of verification fields. In other words, the verification sequence is obtained based on the verification logical relationships between the verification fields, followed by adjusting the order of the fields according to the verification scores to obtain the final verification sequence.

In some embodiments, the further ordering of logical verification sequence for the plurality of verification fields in low-to-high order includes: first, verify verification fields that have lower pass rates before verify the verification fields that have higher pass rates. The further ordering of the verification sequence for the plurality of verification fields allows a quicker determination of whether the verification information has been verified. The further ordering increases verification efficiency. In addition, the verification scoring table includes weights relating to the plurality of verification fields. In some embodiments, the weights are set in advance to move some verification fields forward in the verification sequence and satisfy special verification goals.

Regarding the further ordering of the logical verification sequence for the plurality of verification fields in low-to-high order, the ordering according to verification field score is only carried out between logical relationships at the same level. For example, in a form that has five verification fields (A, B, C, D and E) to be verified, the verification logic sequence of the five verification fields is A&&B&&C&& (D||E). Thus, the further ordering is carried out between all of the A, B, C and D||E that contain the logical relationship "&&" or between D and E that contain the logical relationship "||".

In 130, the server verifies the plurality of verification fields according to the verification sequence.

The verification result for each verification field is verification passed or verification failed.

When the verification results for the plurality of verification fields is verification passed, the verification result for the verification information is verification passed, and a notice is sent to the user stating that the verification information passed. When the verification result for the current verification field is verification failed, the verification result for the verification information is verification failed, and a notice stating that the verification information has failed is sent to the user along with a revision suggestion (e.g., "Verification Field 3 is incorrect. Please try again."). In some embodiments, the user revises the verification information according to the revision suggestion and re-submits the verification information until the verification result of the verification information is verification passed.

In 140, the server terminates verification when verification of the current verification field fails.

In some embodiments, the server terminates verification of the one or more fields that have not yet participation in verification during verification of the plurality of verification fields, in the event that the current verification field fails verification. In this example, the terminating of the verification effectively reduces the verification time and increases verification efficiency.

For example, a form containing three verification fields (A, B and C) undergoes verification. In a first example, if the verification sequence for the three verification fields is A&&B&&C, and if all the verification results that are obtained for A, B and C are verification passed, the verification result for the verification information is verification passed. Subsequently, the verification results for the three verification fields A, B and C are stored in the verification results recording table. In a second example, in the event that A passes verification and then B undergoes verification, but B fails verification. Verification is then terminated after B fails verification, and C does not undergo verification. In this case, the verification result for the form is verification failed. The verification results for the verification fields are: A verification passed, B verification failed. The verification results for the two verification fields A and B are stored in the verification results recording table. C does not undergo verification, and thus the verification result of C is not to be stored. Of course, other verification results are generated. The repetition of the other verification results is omitted for conciseness.

In 150, the server stores verification results in a verification results recording table, and updates the verification scoring table based on the verification results recording table.

The server acquires the verification results recording table having same the form identifier and the field identifiers based on the form identifier and the field identifiers corresponding to the plurality of verification fields in the verification information, and the server stores the verification result of each verification field in the verification results recording table.

In addition, in some embodiments, while the verification information is being verified, the time spent verifying each verification field is counted and is also stored in the verification results recording table. When the verification time spent and the verification results are being stored, previous verification times spent and verification results that were already stored in the verification results recording table are retained. In some embodiments, the verification time spent and the verification result for each verification field are stored immediately after the previous ones. Thus, a plurality of verification results and a plurality of verification times spent corresponding to the same form identifier are recorded in one verification results recording table.

The verification results and the verification times spent for the plurality of verification fields are stored so that the verification results recording table can be used to update the verification scoring table and to accumulate verification data for the verification of the verification information. In this way, the process of verifying the verification information can be adjusted based on statistical information and be made more efficient.

In some embodiments, scheduled tasks or other such technical means are used to preset tasks—the processing time points for configuration tasks and the time interval for data that is to be processed with each task. A time point relates to a starting time for a configuration task to start. In other words, the statistical start time, the statistical end time, and the task processing time are preset. Moreover, the verification results recording table between the statistical start time and the statistical end time is extracted during the task processing time. The verification results recording table is subjected to statistical counting and calculations according to the statistical rules and weight configurations. The statistical start time and the statistical end time are used to define a time interval for data that is to be processed with each task. Furthermore, at the task processing time, the time interval is determined from the statistical start time and the statistical end time stored in the verification results recording table.

Please note that the statistical start time and the statistical end time are the statistical start time and the statistical end time for each verification field of the verification information.

In addition, in some embodiments, when a large quantity of verification information exists, historical data of the verification results recording table and the verification scoring table within a certain range is periodically deleted to reduce the amount of stored data in order to add other scheduled tasks. For example, every day at a predetermined time, historical data that is older than 3 days is deleted. The periodic deleting of the historical data prevents the amount of stored data from becoming too large and thus affecting querying efficiency and the amount of storage space occupied.

The server acquires weights having the same form identifier and the field identifiers from among the statistical rules and weight configurations based on the form identifier and field identifiers of the verification results recording table. The acquired weights are also the weights for the verification fields corresponding to the form identifier and the field identifiers.

In some embodiments, the statistical rules and weight configurations further include counting and calculating rules. The parameters associated with each verification field are counted and calculated according to the counting and calculating rules. The parameters for each verification field include: counting mean verification time spent, mean verification time to pass, mean verification time to fail, weights, the calculated score, the verification pass rate for each verification field, or any combination thereof. For example:

Verification field score=Mean verification time spent×Verification pass rate−Weight;

Verification pass rate=Verification pass data/Total verification volume. The verification pass rate corresponds to the rate in which verification was successful. For example, assuming that field A has been verified 10 times, where there are 8 successes and 2 failures. Accordingly, the verification pass rate is 80%. In some embodiments, the weights are preset and used to influence the verification sequences.

For example, verification information of a form includes three verification fields (A, B and C), and the verification logic sequence for the three verification fields is A&&B&&C. On the first day, 10,000 people register as members through this form. A scheduled task will be to read the verification results recording table for the 10,000 people. In accordance with the counting and calculating rules, the weights of the verification fields are to be counted, and the scores for the verification fields are to be calculated. In addition, the weights are to be preset to 0.

9,000 of the 10,000 people pass A verification, with a mean verification time spent of 100 ms. Thus, the verification pass rate corresponds to 90.0000%, and the score corresponds to 90.0000. In addition, verification failed notices are sent to the 1,000 people who failed verification along with revision recommendations.

8,500 of the 9,000 people who passed A verification also pass B verification, with a mean verification time spent of 5 ms. Thus, the verification pass rate corresponds to 94.4444%, and the score corresponds to 4.7222. In addition, verification failed notices are sent to the 500 people who failed verification along with revision recommendations.

5,000 of the 8,500 people who passed B verification pass C verification, with a mean verification time of 500 ms. Thus, the verification pass rate corresponds to 58.8235%, and the score corresponds to 294.1175. In addition, verification failed notices are sent to the 3,500 people who failed verification along with revision recommendations.

When, on the second day, the form verification information for 10,000 people again undergoes verification, the first-day scores for the three verification fields are used to order the verification logic sequence of the three verification fields from low to high. Thus, the verification sequence of B&&A&&C is obtained.

Thus, the first-day total verification time spent is 100 ms×10,000 people+5 ms×9,000 people+500 ms×8,500 people=5,295,000 ms. With the pass rate remaining the same, the second-day total verification time spent is 5 ms×10,000 people+100 ms×(10,000 people×94.4444%)+500 ms×(10,000 people×94.4444%×58.8235%)=3,772,219.0817 ms. A comparison between the 2 total verification times spent illustrates that adjusting the verification logic sequence decreases the total verification time spent and increases the verification efficiency for the three verification fields.

Other circumstances may be present. Therefore, in some embodiments, the verification sequence is altered by setting weights. For example, a problem of system performance overload as a consequence of verifying A could exist. To avoid this problem of system performance overload, the verification sequence is adjusted by setting a weight for A. The weight for A is set at "−300" by an administrator. The value of the weight is chosen empirically based on experience. The scores for the three verification fields are calculated using the formula above: A corresponds to 390, B corresponds to 4.7222, and C corresponds to 294.1175. Therefore, the verification sequence based on the verification logic sequence becomes B&&C&&A. By setting a weight for A, the position of A is moved to the end of the verification sequence. The moving of the position of A to the end of the verification sequence reduces the likelihood that the verifying of A will cause the problem of system performance overload. The moving of the position of A indirectly reduces resources spent on verification and increases verification efficiency.

If the verification results recording table between the statistical start time and statistical end time contains a plurality of verification results and a plurality of verification times spent, the mean values of the plurality of pieces of data will be counted and calculated.

Possible scenarios include validating picture content, document content, or forms involving larger expenditures of resources. Verification data, for example, mean verification time spent, verification pass rate, and scores, is accumulated during the verification process. Using the accumulated data, the verification process is adjusted and optimized: verification time is reduced, verification expenditures are reduced, and verification efficiency is increased.

In some embodiments, the counting and calculating of the parameters associated with each verification field further includes storing the parameters associated with each verification field into a verification scoring table. Prior to the storing operation, the server queries the verification scoring table containing the same form identifier as the parameters and then stores parameters which are associated with each verification field in positions immediately following the parameters that were already stored, while retaining the historical versions of the verification scoring table that were already stored.

When storing the parameters, the server by default acquires a new version number and stores the parameters and the new version number in the verification scoring table. The principle relating to the version numbers is similar to the principle behind software versions. For example, there are sets of logic relating to different version numbers, for example, v1.0, v2.0, v3.0. Each time the parameters are saved, which corresponds to updating the scoring table, a new version number for the updated scoring table is also saved. For example, the server uses a time stamp to create a new version number and thus ensure that version numbers are unique within the same verification information. Because of changes in the business operating environment, data, or any combination thereof, the verification scoring table has different versions. Therefore, in 120 of FIG. 1, the acquiring of the verification rule configuration and the verification scoring table with the same form identifiers and the field identifiers, the server automatically compares the version numbers and uses the verification scoring table with the most recent version number to further order the verification logic sequence for the plurality of verification fields. For example, the first verification scoring table version number stored is 001, and the second verification scoring table version number stored is 002. When acquiring the verification scoring table, the server compares the two version numbers 001 and 002. Since version number 002 is the latest version number of the two version numbers, the acquisition result is the verification scoring table with the version number 002.

In some embodiments, under some circumstances (when, for example, a problem occurs in the counting and calculating process that requires emergency repair), a historical version number of the verification scoring table is used for further ordering of the verification logic sequence for the plurality of verification fields. Thus, in 120, the acquiring of the verification rule configuration and the verification scoring table with the same form identifiers and the field identifiers uses the version number as a condition for acquiring the verification scoring table. Thus, the version number is used to acquire the verification scoring table of any version number.

If, in the some embodiments, the form identifier and field identifiers corresponding to the plurality of verification fields in the verification information are used in verification for the first time, then no verification scoring table and no verification results recording table for the verification information exists. In 120, the form identifier and the field identifiers serve as conditions for acquiring the verification rules configuration and the verification scoring table and the verification scoring table has null values. In 130, the plurality of verification fields are verified based on a verification sequence. In 150, a form identifier, field identifiers, verification results, and verification times spent for the plurality of verification fields are stored into the verification results recording table. After the data undergo counting and calculation, the form identifier, the field identifiers, statistical start times, statistical end times, mean verification times spent, mean verification time to pass, mean verification time to fail, scores, verification pass rates, and weights for the plurality of verification fields are stored in the verification scoring table.

In some embodiments, the verification information is a single verification field. The single verification field also includes unique form identifiers and field identifiers. As an aspect, the plurality of verification fields of the verification information is understood as the repackaging of single verification fields. Verification of the plurality of verification fields is understood as being carried out on a foundation of single verification fields.

Figure 2A:
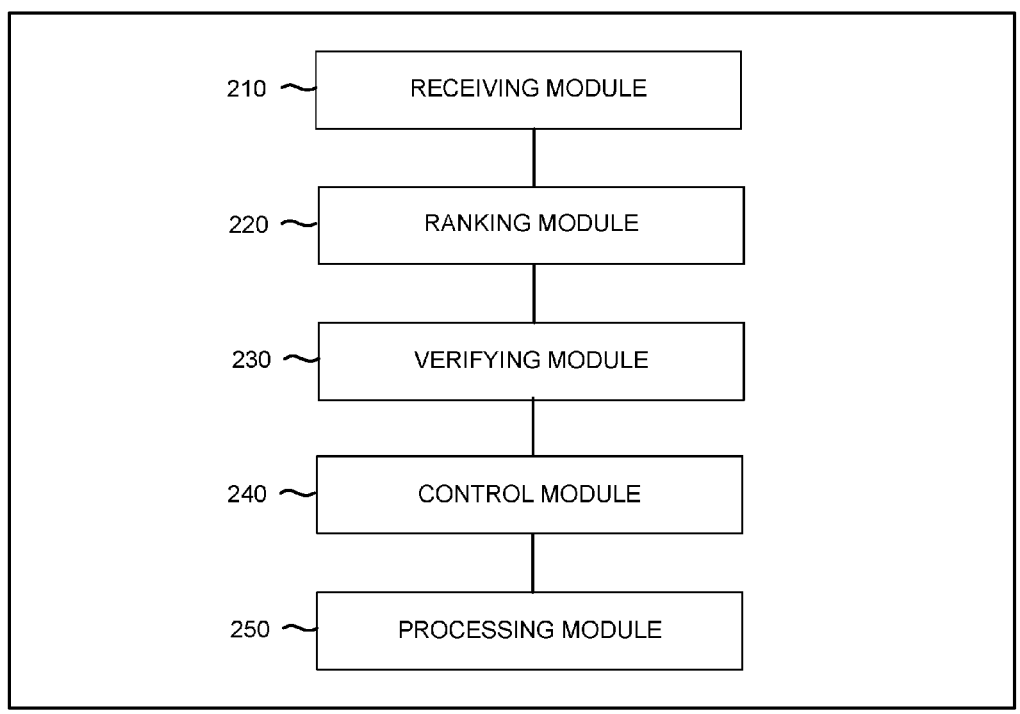
FIG. 2A is a modular diagram of an embodiment of a system for network validation of information.

FIG. 2A is a modular diagram of an embodiment of a system for network validation of information. In some embodiments, the system 200 includes a receiving module 210, a ranking module 220, a verifying module 230, a control module 240, and a processing module 250.

The receiving module 210 receives verification information from users. The verification information includes a plurality of verification fields.

The ranking module 220 determines a verification sequence of the plurality of verification fields based on a verification rule configuration and a verification scoring table.

The verification rule configuration and the verification scoring table having the same form identifiers and field identifiers are acquired based on form identifiers and field identifiers corresponding to the plurality of verification fields in the verification information.

In some embodiments, a verification logic sequence for the plurality of verification fields is obtained based on the verification rule configuration. Based on the score and weight of each verification field in the verification scoring table, a further ordering of the verification logic sequence for the plurality of verification fields is performed to obtain the verification sequence for the plurality of verification fields.

The verification logic sequence for the plurality of verification fields is modified using the scores and weights of the verification fields. In some embodiments, the modification of the verification logic sequence for the plurality of verification fields increases verification efficiency.

The verifying module 230 verifies the plurality of verification fields according to the verification sequence.

When the plurality of verification fields undergo verification and the verification results for the plurality of verification fields are verification passed, the verification result for the verification information is verification passed, and a notice is sent to the user stating that the verification information passed. When the verification result for the current verification field is verification failed, the verification result for the verification information is verification failed, and a notice stating that the verification information has failed is sent to the user along with a revision suggestion.

The control module 240 terminates verification in the event that verification of the current verification field fails.

The control module 240 terminates verification of the one or more fields that have not yet taken part in verification during verification of the plurality of verification fields, as an example, when the current verification field fails verification. In this way, the terminating of verification effectively reduces the verification time and increases verification efficiency.

When the verification failed occurs for the current verification field, verification is terminated. The verification time is thus reduced, and verification efficiency is increased.

The processing module 250 stores verification results in a verification results recording table and updates the verification scoring table based on the verification results recording table.

The processing module 250 acquires the verification results recording table having the same form identifier and field identifiers based on the form identifier and the field identifiers corresponding to the plurality of verification fields in the verification information, and the processing module 250 stores the verification result of each verification field in the verification results recording table.

Figure 2B:
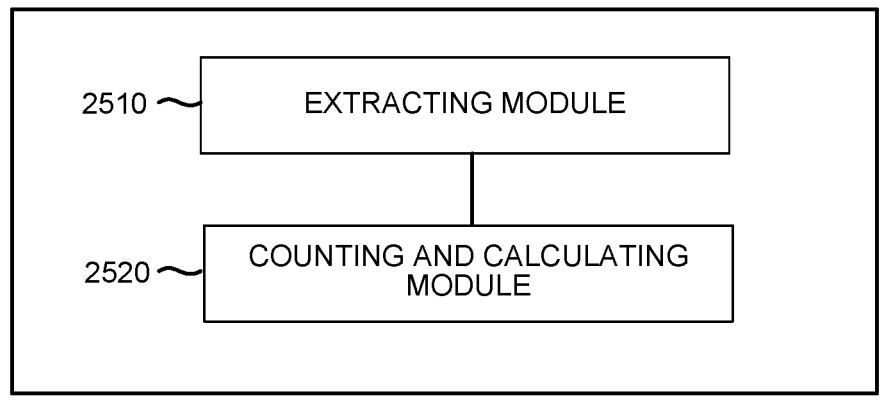
FIG. 2B is a modular diagram of an embodiment of a processing module.

FIG. 2B is a modular diagram of an embodiment of a processing module. In some embodiments, the processing module 250 includes an extracting module 2510 and a counting and calculating module 2520.

The extracting module 2510 presets the statistical start time, the statistical end time, and the task processing time for the verification information, which are used to extract the verification results recording table at the task processing time between the statistical start time and the statistical end time.

The counting and calculating module 2520 performs statistical counting and calculating on the verification results recording table based on statistical rules and weight configurations. Furthermore, in some embodiments, the counting and calculating module 2520 acquires weights having the same form identifiers and the field identifiers from among the statistical rules and weight configurations based on the form identifiers and field identifiers of the verification results recording table. In some embodiments, the statistical rules and weight configurations further include counting and calculating rules. Parameters associated with each verification field are counted and calculated based on the counting and calculating rules. The parameters include form identifiers, field identifiers, scores, version numbers, mean verification times spent, mean verification time to pass, mean verification time to fail, verification pass rate, weights, etc. In some embodiments, the counting and calculating module 2520 also queries verification scoring tables that have the same form identifiers as the parameters and stores the parameters associated with each verification field into the verification scoring tables.

Implementations of the various modules included in the system as described according to FIGS. 2A and 2B corresponds to implementations of the method. The method embodiment for network validation of information as shown in FIG. 1 has already been described. Therefore, repetition of descriptions of the various modules is omitted for conciseness.

The method and system can be applied to any equipment that validates information. In some embodiments, equipment that validates information includes, but is not limited to: desktop computers, mobile terminal equipment, laptop computers, tablet computers, and personal digital assistants.

The modules described above can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

Figure 3:
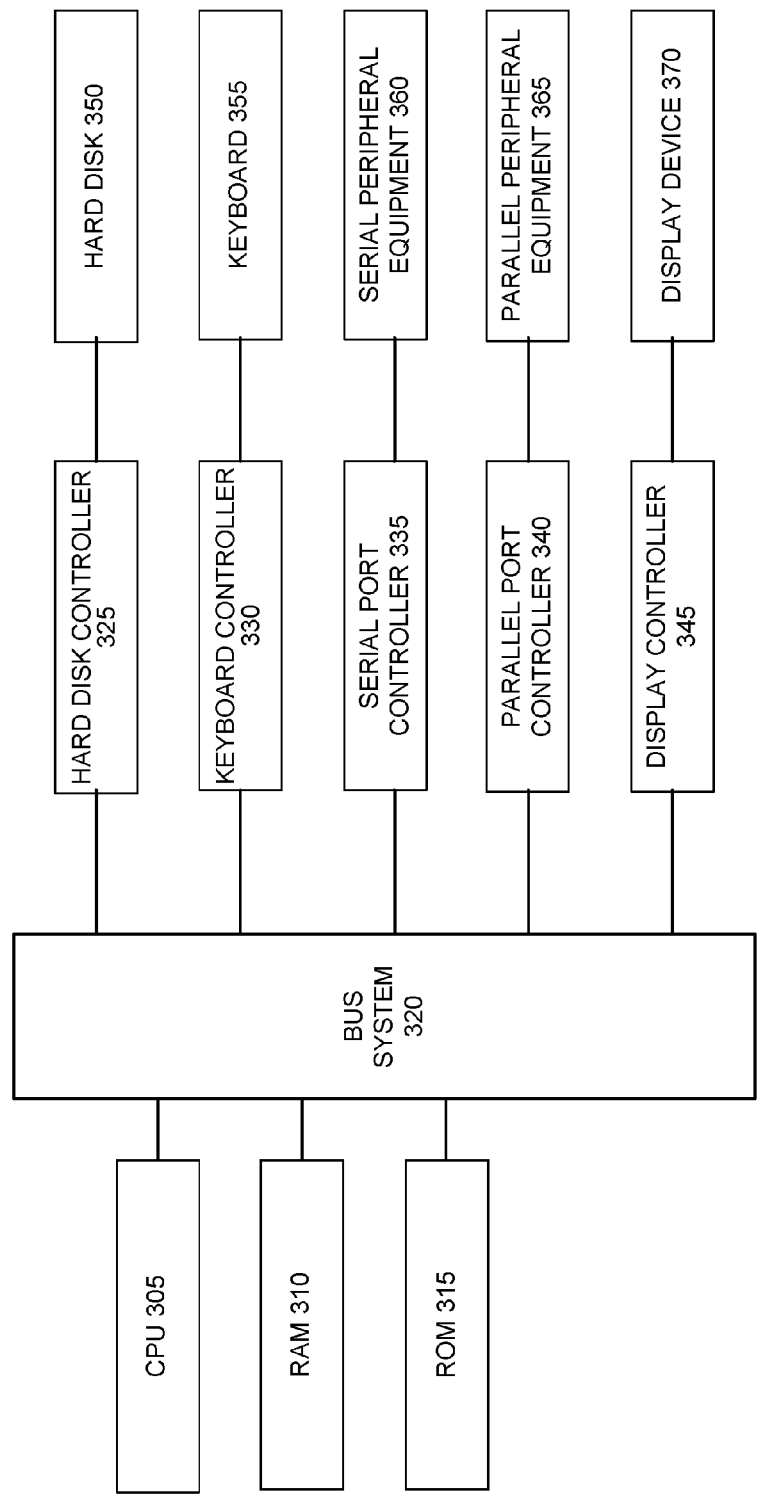
FIG. 3 is a block diagram of an embodiment of a computer system for network validation of information.

FIG. 3 is a block diagram of an embodiment of a computer system for network validation of information. In some embodiments, the computer system 300 includes a CPU (central processing unit) 305, RAM (random access memory) 310, ROM (read-only memory) 315, system bus 320, hard disk controller 325, keyboard controller 330, serial port controller 335, parallel port controller 340, display controller 345, hard disk 350, keyboard 355, serial peripheral equipment 360, parallel peripheral equipment 365, and display device 370. Among these components, the following are connected to the system bus 320: CPU 305, RAM 310, ROM 315, hard disk controller 325, keyboard controller 330, serial controller 335, parallel controller 340, and display controller 345. The hard disk 350 is connected to the hard disk controller 325. The keyboard 355 is connected to the keyboard controller 330. The serial peripheral equipment 360 is connected to the serial port controller 335. The parallel peripheral equipment 365 is connected to the parallel port controller 340, and the display device 370 is connected to the display controller 345.

Figure 4:
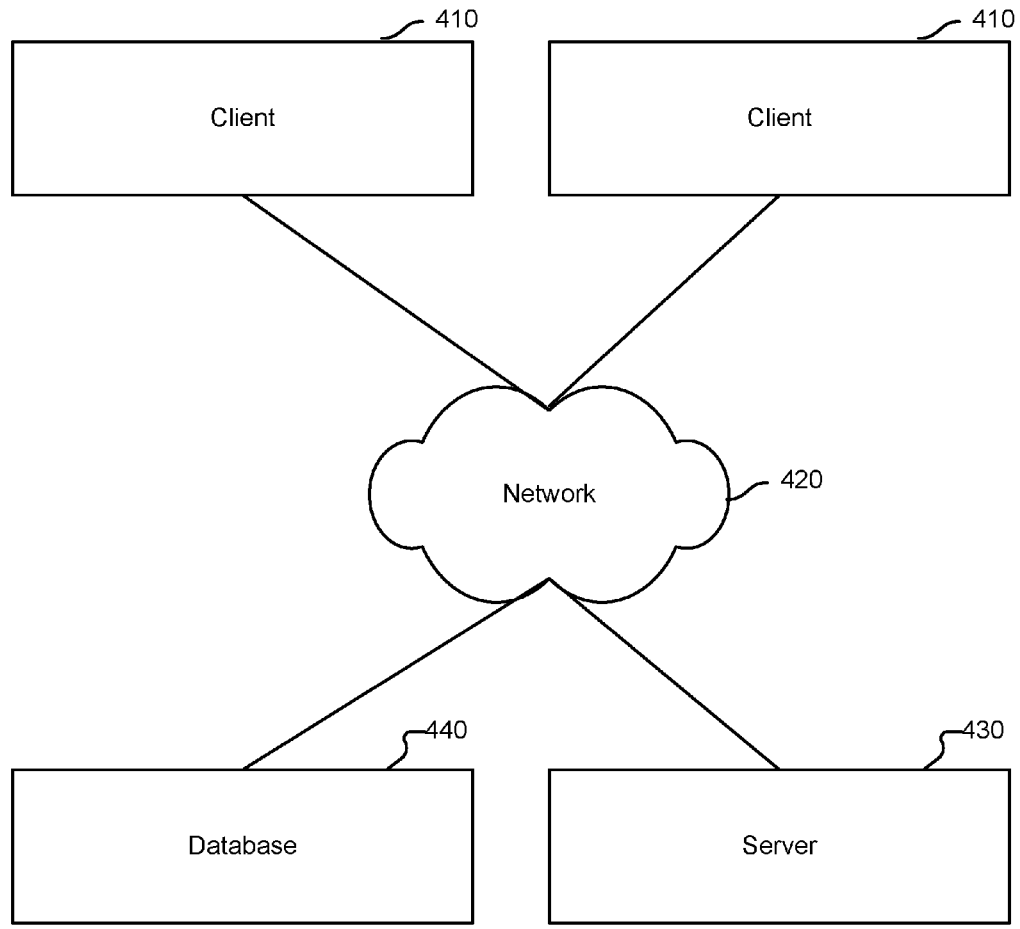
FIG. 4 is a schematic diagram of an embodiment of a system for network validation of information.

FIG. 4 is a schematic diagram of an embodiment of a system for network validation of information. The system 400 includes a plurality of clients 410 and a server 430 connected via a network 420.

In some embodiments, one of the clients 410 sends the server 430 a form for verification across the network 420. The server 430 stores the verification scoring table and/or the verification results recording table in a database 440 via the network 420.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for network validation of information, comprising:
   receiving verification information from a user, the verification information including a plurality of verification fields, wherein the plurality of verification fields includes a first verification field and a second verification field;
   determining a verification sequence of the plurality of verification fields based on a verification rule configuration and a verification scoring table, wherein:
      the first verification field has a first verification score and the second verification field has a second verification score;
      the first verification score is determined based at least in part on a verification time and a verification pass rate of the first verification field;
      the second verification score is determined based at least in part on a verification time and a verification pass rate of the second verification field; and
      the first verification field or the second verification field having the lower of the first verification score or the second verification score appears earlier in the verification sequence than the other verification field;
   verifying a current verification field according to the verification sequence;
   verifying a next verification field in the event that the verification of the current verification field succeeds;
   terminating verification in the event that the verification of the current verification field fails;
   storing a verification result in a verification results recording table, wherein the verification results recording table stores a verification result of each verification field; and
   updating the verification scoring table based on the verification results recording table, comprising:
      extracting the verification results recording table at a task processing time between a statistical start time and a statistical end time; and
      performing data counting and calculations on the verification results recording table according to statistical rules and weight configurations.

2. The method as described in claim 1, wherein the verification information corresponds to a form identifier, the plurality of verification fields correspond to a respective plurality of field identifiers, each form identifier is unique, and each field identifier is unique.

3. The method as described in claim 2, wherein:
   the verification rule configuration provides verification logic relationships between the plurality of verification fields;
   the verification scoring table provides one or more parameters associated with each verification field; and
   the determining of the verification sequence of the plurality of verification fields based on the verification rule configuration and the verification scoring table comprises:
      acquiring the verification rule configuration and the verification scoring table having the same form identifier and the same field identifiers based on the form identifier and the field identifier corresponding to the plurality of verification fields in the verification information;
      obtaining a verification logic sequence between the plurality of verification fields based on the verification rule configuration; and
      performing a further ordering of the verification logic sequence of the plurality of verification fields based on scores and weights of the verification fields in the verification scoring table.

4. The method as described in claim 2,
   wherein the storing of the verification result in the verification results recording table further comprises:
      acquiring the verification results recording table having the same form identifier and the same field identifiers based on the form identifier and the field identifiers corresponding to the plurality of verification fields in the verification information and storing the verification results of the verification fields in the verification results recording table.

5. The method as described in claim 2,
   wherein the storing of the verification result in the verification results recording table further comprises:
      acquiring the verification results recording table having the same form identifier and the same field identifiers based on the form identifier and the field identifiers corresponding to the plurality of verification fields in the verification information and storing the verification results of the verification fields in the verification results recording table; and
   wherein the storing of the verification result in the verification results recording table further comprises:
      retaining the verification results that have already been stored.

6. The method as described in claim 2,
   wherein the performing of the data counting and calculations comprises:
      acquiring weights having the same form identifier and the same field identifiers from among the statistical rules and weight configurations based on the form identifier and the field identifiers of the verification results recording table, wherein the statistical rules and weight configurations include counting and calculating rules, and counting and calculating parameters associated with the verification fields according to the counting and calculating rules.

7. The method as described in claim 2, further comprising:
   querying the verification scoring table containing the same form identifier as the parameters; and
   storing parameters associated with the verification fields into the verification scoring table, and
   wherein the performing of the data counting and calculations comprises:

acquiring weights having the same form identifier and the same field identifiers from among the statistical rules and weight configurations based on the form identifier and the field identifiers of the verification results recording table, wherein the statistical rules and weight configurations include counting and calculating rules, and counting and calculating parameters associated with the verification fields according to the counting and calculating rules.

8. The method as described in claim 1, wherein:
the verification rule configuration provides verification logic relationships between the plurality of verification fields; and
the verification scoring table provides one or more parameters associated with each verification field.

9. The method as described in claim 1, wherein the verifying of the current verification field according to the verification sequence further comprises:
in the event that all of the verification results of the plurality of verification fields pass verification, determining that a verification result of the verification information indicates that verification has passed, and sending a notice to the user indicating that the verification information has passed verification; and
in the event that the current verification field fails, determining that the verification result of the verification information is verification failed, and sending a notice to the user indicating that the verification information has failed along with a revision suggestion.

10. The method as described in claim 1,
wherein the extracting of the verification results recording table at the task processing time between the statistical start time and the statistical end time comprises:
presetting the statistical start time, the statistical end time, and the task processing time.

11. A system for network validation of information, comprising:
at least one processor configured to:
receive verification information from a user, the verification information including a plurality of verification fields, wherein the plurality of verification fields includes a first verification field and a second verification field;
determine a verification sequence of the plurality of verification fields based on a verification rule configuration and a verification scoring table, wherein:
the first verification field has a first verification score and the second verification field has a second verification score;
the first verification score is determined based at least in part on a verification time and a verification pass rate of the first verification field;
the second verification score is determined based at least in part on a verification time and a verification pass rate of the second verification field; and
the first verification field or the second verification field having the lower of the first verification score or the second verification score appears earlier in the verification sequence than the other verification field;
verify a current verification field according to the verification sequence;
verify a next verification field in the event that the verification of the current verification field succeeds;
terminate verification in the event that the verification of the current verification field fails;
store a verification result in a verification results recording table, wherein the verification results recording table stores a verification result of each verification field; and
update the verification scoring table based on the verification results recording table, comprising to:
extract the verification results recording table at a task processing time between a statistical start time and a statistical end time; and
perform data counting and calculations on the verification results recording table according to statistical rules and weight configurations; and
a memory coupled to the at least one processor and configured to provide the at least one processor with instructions.

12. The system as described in claim 11, wherein the verification information corresponds to a form identifier, the plurality of verification fields correspond to a respective plurality of field identifiers, each form identifier is unique, and each field identifier is unique; and
wherein the determining of the verification sequence of the plurality of verification fields based on the verification rule configuration and the verification scoring table comprises:
acquire the verification rule configuration and the verification scoring table having the same form identifier and the same field identifiers based on the form identifier and the field identifier corresponding to the plurality of verification fields in the verification information;
obtain a verification logic sequence between the plurality of verification fields based on the verification rule configuration; and
perform a further ordering of the verification logic sequence of the plurality of verification fields based on scores and weights of the verification fields in the verification scoring table.

13. The system as described in claim 11, wherein the verifying of the current verification field according to the verification sequence further comprises:
in the event that all of the verification results of the plurality of verification fields pass verification, determine that a verification result of the verification information is verification passed, and send a notice to the user indicating that the verification information has passed verification; and
in the event that the current verification field fails, determine that the verification result of the verification information is verification failed, and send a notice to the user indicating that the verification information has failed along with a revision suggestion.

14. The system as described in claim 11,
wherein the verification information corresponds to a form identifier, the plurality of verification fields correspond to a respective plurality of field identifiers, each form identifier is unique, and each field identifier is unique; and
wherein the storing of the verification result in the verification results recording table further comprises to:
acquire the verification results recording table having the same form identifier and the same field identifiers based on the form identifier and the field identifiers corresponding to the plurality of verification fields in the verification information and store the verification results of the verification fields in the verification results recording table.

15. The system as described in claim 11, wherein:
the extracting of the verification results recording table at the task processing time between the statistical start time and the statistical end time comprises to:
preset the statistical start time, the statistical end time, and the task processing time.

16. The system as described in claim 11, wherein:
the verification information corresponds to a form identifier, the plurality of verification fields correspond to a respective plurality of field identifiers, each form identifier is unique, and each field identifier is unique; and
the performing of the data counting and calculations comprises to:
acquire weights having the same form identifier and the same field identifiers from among the statistical rules and weight configurations based on the form identifier and the field identifiers of the verification results recording table, wherein the statistical rules and weight configurations include counting and calculating rules, and counting and calculating parameters associated with the verification fields according to the counting and calculating rules.

17. The system as described in claim 11, wherein:
the verification information corresponds to a form identifier, the plurality of verification fields correspond to a respective plurality of field identifiers, each form identifier is unique, and each field identifier is unique;
the at least one processor is further configured to:
query the verification scoring table containing the same form identifier as the parameters;
store parameters associated with the verification fields into the verification scoring table; and
the performing of the data counting and calculations comprises to:
acquire weights having the same form identifier and the same field identifiers from among the statistical rules and weight configurations based on the form identifier and the field identifiers of the verification results recording table, wherein the statistical rules and weight configurations include counting and calculating rules, and counting and calculating parameters associated with the verification fields according to the counting and calculating rules.

18. A computer program product for network validation of information, the computer program product being embodied in a tangible non-transitory computer readable storage medium and comprising computer instructions for:
receiving verification information from a user, the verification information including a plurality of verification fields, wherein the plurality of verification fields includes a first verification field and a second verification field;
determining a verification sequence of the plurality of verification fields based on a verification rule configuration and a verification scoring table, wherein:
the first verification field has a first verification score and the second verification field has a second verification score;
the first verification score is determined based at least in part on a verification time and a verification pass rate of the first verification field;
the second verification score is determined based at least in part on a verification time and a verification pass rate of the second verification field; and
the first verification field or the second verification field having the lower of the first verification score or the second verification score appears earlier in the verification sequence than the other verification field;
verifying a current verification field according to the verification sequence;
verifying a next verification field in the event that the verification of the current verification field succeeds;
terminating verification in the event that the verification of the current verification field fails;
storing a verification result in a verification results recording table, wherein the verification results recording table stores a verification result of each verification field; and
updating the verification scoring table based on the verification results recording table, comprising:
extracting the verification results recording table at a task processing time between a statistical start time and a statistical end time; and
performing data counting and calculations on the verification results recording table according to statistical rules and weight configurations.

\* \* \* \* \*